Sept. 9, 1958 H. G. BEAVERS 2,850,962

DEVICE FOR STUFFING AND ROASTING FOWL AND MEAT

Filed April 5, 1954

INVENTOR.

(Mrs) Hazel G. Beavers

United States Patent Office 2,850,962

Patented Sept. 9, 1958

1

2,850,962

DEVICE FOR STUFFING AND ROASTING FOWL AND MEAT

Hazel G. Beavers, Alhambra, Calif., assignor of one-tenth to Gadget-Of-The-Month Club, Inc., Los Angeles, Calif., a corporation of California Application April 5, 1954, Serial No. 420,903

1 Claim. (Cl. 99—426)

This invention relates to a novel and useful device which by its features and provisions may be used for holding a fowl when stuffing the same and thereafter the fowl being located in the same position on the device may be placed in the oven and roasted, and then served, still held on the same device.

The object of my invention is to provide a metallic holder preferably made from stainless steel, aluminum, or silver plated metal, to have diversified purpose, combine in assembly of a holder in which meat or fowl is held during preparation for cooking, to be cooked in same device, and to serve without removing it from the said device.

Another object of my invention is the special construction of the device for holding meat or fowl with the provision consisting of removable or hinged sides which can be adjusted to the size of a piece of meat to be held in it. A further object of my invention is to provide a tray on which the device is located when cooking, and another tray on which metal tray may be placed when after meat is roasted it may be served at the dining table. All of the foregoing and further advantages of my invention will become apparent from the following description and accompanying drawings which illustrate preferred embodiment thereto of which:

Figure 1:
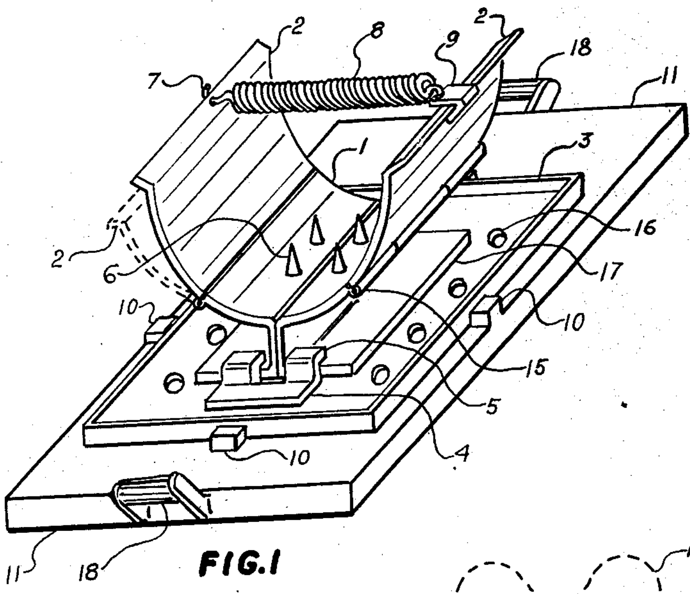
Figure 1 is a perspective view of the device.
Figure 2:
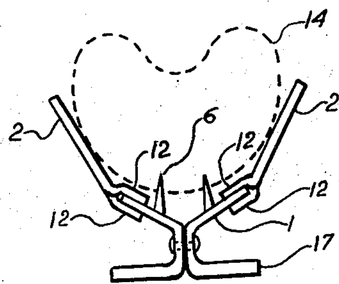
Figure 2 is a front elevational view of the device.
Figure 3:
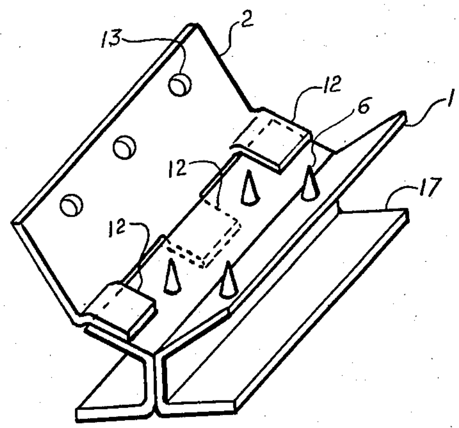

Figure 3 is a perspective view of the device showing embodiments of the invention. The present device for stuffing and roasting fowl and meat is principally composed from an elongated channel 1 shown on Figure 1, Figure 2, and Figure 3. In reference to Figure 1, the elongated channel 1 is provided with side plates 2 attached to its bottom plate by means of hinges 15. The bottom plate of channel is provided with plurality of pointed pins 6 projecting upright from it. A spring 8 is attached to the upper edge of one side plate 2. The spring 8 is provided at its other end with a hook 7 which overlaps the opposite side plate 2 and holds both plates together. The fowl or meat is located on the bottom plate of the channel, the pins 6 penetrating it. Then the spring 8 is stretched across the meat connecting side plates 2. The spring 8 will adjust itself to the size of meat or fowl held in the device. The meat holder before placing it in the oven is located on metal trays 3 and held at one end by piece 4 which piece is rigidly attached to the tray. The piece 4 is provided with locks 5 which overlap the holder stand 17. The metal tray 3 may be provided with holes 16 to enable the grease or sauce to escape, when cooking, or can be made from wire mesh or perforated metal sheet. As another variant of my invention the metal tray 3 is made from solid metal sheet without holes to provide for holding the grease or sauce. After roasting meat or fowl, the metal tray 3 together with the device located on it and holding ready to serve meat or fowl is placed on tray 11 and served to the dining table. The tray 11 may be made from wood or any other material best suited for the purpose. The tray 11 may be provided with means to hold the metal tray 3 in place such as pieces 10 shown on Figure 1 which overlap the tray 3. When it is located on tray 11 the Figure 2 illustrates general manner in which meat or fowl 14, represented by dotted line, is located on the device.

2

Figure 3 shows another embodiment of the invention: The side plates 2 are provided with extending elements 12 which are interlocking with the bottom plate 1. The side plates may be made of different sizes in sets of two; each different size set serves for different quantity of meat to be held in device or a fowl of different size. The side plates are provided with holes 13 which will facilitate removal of the side plates 2 by inserting in it hooks or other objects suitable for the purpose. The use of interchangeable side plates 3 which interlock with bottom of holder by means of elements 12 are easily removable and have the advantage of facilitating the cleaning of the device. It is believed that the advantages of device for stuffing and roasting fowl and meat will be readily understood, and although the preferred embodiments of the device are as illustrated and described, it is understood that changes in details of construction may be made without departing from the spirit of the present invention.

What is claimed is:

A device for stuffing and/or roasting fowl and meat, comprising: a longitudinal continuous channel of substantially U-shaped cross-section open along the top thereof and provided with an underlying flat base forming a stand, said channel including a continuous generally horizontally directed longitudinal bottom portion having two horizontally spaced longitudinal outer edges, said channel also including two continuous separate opposed spaced generally upwardly directed longitudinal side portions each having a longitudinal upper edge and a longitudinal lower edge in vertically spaced relationship, said bottom portion of said channel being provided with a plurality of pointed pins projecting upwardly therefrom, the lower edges of said side portions being effectively hinged with respect to the outer edges of said bottom portion for outward pivotal movement to facilitate positioning of a food object above said bottom portion and between said side portions; spring means connecting said side portions and biasing them toward each other; and a tray effectively positioned under the flat base, said tray and flat base including selectively engageable retaining means locking the flat base in a predetermined position on the tray.

References Cited in the file of this patent

UNITED STATES PATENTS

| | | |
|---|---|---|
| 1,044,438 | Briggs | Nov. 12, 1912 |
| 1,358,063 | Demuth | Nov. 9, 1920 |
| 2,090,234 | Robinowitz | Aug. 17, 1937 |
| 2,584,295 | Sanzebacher | Feb. 5, 1952 |